US009382417B2

(12) United States Patent
Gürtler et al.

(10) Patent No.: US 9,382,417 B2
(45) Date of Patent: Jul. 5, 2016

(54) PROCESS FOR THE PREPARATION OF POLYETHER CARBONATE POLYOLS

(75) Inventors: Christoph Gürtler, Köln (DE); Jörg Hofmann, Krefeld (DE); Thomas Ernst Müller, München (DE); Aurel Wolf, Wülfrath (DE); Stefan Grasser, Leverkusen (DE); Burkhard Köhler, Zierenberg (DE)

(73) Assignee: Covestro Deutschland AG (DE)

( * ) Notice: Subject to any disclaimer, the term of this patent is extended or adjusted under 35 U.S.C. 154(b) by 751 days.

(21) Appl. No.: 13/636,509

(22) PCT Filed: Mar. 24, 2011

(86) PCT No.: PCT/EP2011/054510
§ 371 (c)(1),
(2), (4) Date: Nov. 26, 2012

(87) PCT Pub. No.: WO2011/117332
PCT Pub. Date: Sep. 29, 2011

(65) Prior Publication Data
US 2013/0072602 A1 Mar. 21, 2013

(30) Foreign Application Priority Data
Mar. 24, 2010 (DE) .......................... 10 2010 012 450

(51) Int. Cl.
| *C08L 69/00* | (2006.01) |
| *C08K 5/13* | (2006.01) |
| *C08K 5/47* | (2006.01) |
| *C08K 5/32* | (2006.01) |
| *C08G 65/26* | (2006.01) |
| *C08K 5/3435* | (2006.01) |
| *C08K 5/357* | (2006.01) |
| *C08K 5/46* | (2006.01) |

(52) U.S. Cl.
CPC ............ *C08L 69/00* (2013.01); *C08G 65/2603* (2013.01); *C08G 65/2663* (2013.01); *C08K 5/13* (2013.01); *C08K 5/32* (2013.01); *C08K 5/3435* (2013.01); *C08K 5/357* (2013.01); *C08K 5/46* (2013.01); *C08K 5/47* (2013.01)

(58) Field of Classification Search
CPC ............ C08L 69/00; C08K 5/32; C08K 5/13; C08K 5/46; C08K 5/357; C08K 5/3435; C08K 5/47
USPC ........................................................ 524/83
See application file for complete search history.

(56) References Cited

U.S. PATENT DOCUMENTS

| 3,404,109 A | 10/1968 | Milgrom |
| 3,829,505 A | 8/1974 | Herold |
| 3,941,849 A | 3/1976 | Herold |
| 4,500,704 A | 2/1985 | Kruper, Jr. et al. |
| 5,158,922 A | 10/1992 | Hinney et al. |
| 5,470,813 A | 11/1995 | Le-Khac |
| 6,780,813 B1 | 8/2004 | Hofmann et al. |
| 7,008,900 B1 | 3/2006 | Hofmann et al. |
| 2003/0149232 A1 | 8/2003 | Hinz et al. |
| 2003/0204042 A1 | 10/2003 | Moethrath et al. |
| 2005/0027145 A1 | 2/2005 | Hofmann et al. |
| 2010/0048935 A1 | 2/2010 | Mijolovic et al. |

FOREIGN PATENT DOCUMENTS

| EP | 700949 B1 | 3/1999 |
| EP | 743093 B1 | 12/2001 |
| EP | 761708 B1 | 3/2003 |
| EP | 1359177 A1 | 11/2003 |
| EP | 2112187 A1 | 10/2009 |
| JP | 4145123 A | 5/1992 |
| WO | WO-97/40086 A1 | 10/1997 |
| WO | WO-98/16310 A1 | 4/1998 |
| WO | WO-00/47649 A1 | 8/2000 |
| WO | WO-01/39883 A1 | 6/2001 |
| WO | WO-01/80994 A1 | 11/2001 |
| WO | WO-2004081082 A1 | 9/2004 |
| WO | WO-2004087788 A1 | 10/2004 |
| WO | WO-2006/103214 A1 | 10/2006 |
| WO | WO-2008092767 A1 | 8/2008 |
| WO | WO-2010028362 A1 | 3/2010 |

OTHER PUBLICATIONS

International Search Report for PCT/EP2011/054510 mailed May 18, 2011.
Translation of the International Preliminary Report on Patentability for PCT/EP2011/054510 dated Sep. 25, 2012.

*Primary Examiner* — Robert Harlan
(74) *Attorney, Agent, or Firm* — Drinker Biddle & Reath LLP

(57) ABSTRACT

The present invention relates to a process for the preparation of polyether carbonate polyols by catalytic copolymerization of carbon dioxide ($CO_2$) with alkylene oxides in the presence of one or more H-functional starter substances with the aid of double metal cyanide (DMC) catalysts and in the presence of additives A) chosen from the group consisting of sterically non-hindered phenols, catechols, pyrocatechols, thiazines, phenothiazines, thiazoles, benzothiazoles, oxazines, phenoxazines, 2,2,6,6-tetramethylpiperidine 1-oxyl and nitrostyrenes and optionally in the presence of metal salts B).

15 Claims, No Drawings

PROCESS FOR THE PREPARATION OF POLYETHER CARBONATE POLYOLS

CROSS-REFERENCE TO RELATED APPLICATIONS

This application is a national stage application (under 35 U.S.C. §371) of PCT/EP2011/054510, filed Mar. 24, 2011, which claims benefit of German Application No. 10 2010 012 450.8, filed Mar. 24, 2010, both of which are incorporated herein by reference in their entirety.

The present invention relates to a process for the preparation of polyether carbonate polyols by catalytic copolymerization of carbon dioxide ($CO_2$) with alkylene oxides in the presence of one or more H-functional starter substances with the aid of double metal cyanide (DMC) catalysts and in the presence of additives.

The preparation of polyether carbonate polyols by a catalytic addition reaction of alkylene oxides (epoxides) and carbon dioxide in the presence or absence of H-functional starter substances (starters) has been investigated intensively for more than 40 years (e.g. Inoue et al., Copolymerization of Carbon Dioxide and Epoxide with Organometallic Compounds; Die Makromolekulare Chemie 130, 210-220, 1969). This reaction e.g. using an H-functional starter compound is shown in diagram form in equation (I), wherein R represents an organic radical, such as alkyl, alkylaryl or aryl, each of which can also contain hetero atoms, such as, for example, O, S, Si etc., and wherein e and f represent an integer, and wherein the product shown here for the polyether carbonate polyol in equation (I) is merely to be understood as meaning that blocks with the structure shown can in principle be found in the polyether carbonate polyol obtained, but the sequence, number and length of the blocks and the OH functionality of the starter can vary and is not limited to the polyether carbonate polyol shown in equation (I). This reaction (see equation (I)) is ecologically very advantageous, since this reaction represents the conversion of a greenhouse gas, such as $CO_2$, into a polymer. The cyclic carbonate (for example for R=$CH_3$ propylene carbonate) shown in formula (I) is formed as a further product, actually a by-product.

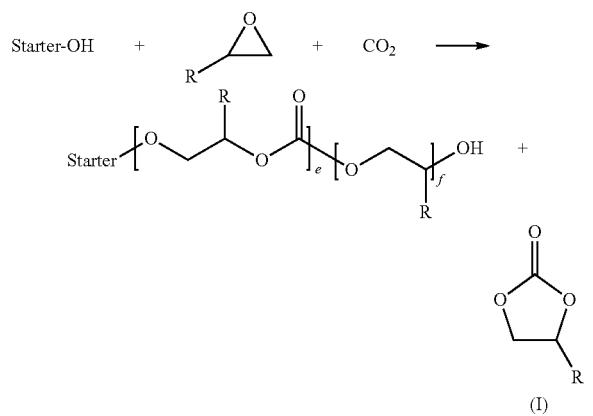

(I)

U.S. Pat. No. 4,500,704 describes the use of DMC catalysts for the copolymerization of epoxides and carbon dioxide. The DMC catalyst is prepared in an aqueous medium and therefore contains a large amount of water. To activate the catalyst, the water is removed down to an amount of less than 5 wt. %. According to the teaching of U.S. Pat. No. 4,500,704, the partial removal of water and an increase in the activity of the catalyst is possible by treating the catalyst with organic complexing agents or coordination compounds, such as alcohols, ethers, esters, sulfides, ketones, aldehydes, amides and/or nitriles. If the DMC catalysts are prepared in the presence of these compounds, these are said to make up 5-30 wt. % of the total weight of the catalyst. However, U.S. Pat. No. 4,500,704 does not disclose that such compounds can be employed as additives in the copolymerization of epoxides with carbon dioxide. WO-A 2004/087788 describes the preparation of polyether carbonate polyols of narrow polydispersity using DMC catalysts, which is achieved by adding a sterically hindered chain transfer reagent which is capable of protonating the growing polymer chain. Sterically hindered chain transfer reagents which are mentioned are: sterically hindered alcohols (e.g. tert-butanol or substituted tert-butanols), tertiary aliphatic alcohols, sterically hindered phenols (e.g. di-tert-butylphenol or substituted di-tert-butylphenols), sterically hindered, polysubstituted phenols and sterically hindered benzoic acid derivatives (e.g. di-tert-butylbenzoic acid or substituted di-tert-butylbenzoic acids). The sterically hindered chain transfer reagents can be added at the start of the reaction or during the polymerization, preferably in at least a 10-fold molar excess relative to the DMC catalyst. In Example 1, 6 mmol of tert-butanol and 0.026 mmol of Zn were employed in the catalyst, from which a ratio of additive/catalyst of 230 results. The number of Zn centres in one mole of DMC catalyst is not disclosed. The large amount of sterically hindered chain transfer reagent added relative to the amount of the DMC catalyst is a disadvantage.

It was therefore the object of the present invention to provide a process for the preparation of polyether carbonate polyols which has a favourable selectivity (i.e. low ratio of cyclic carbonate to linear polyether carbonate) and at the same time a short activation time.

Surprisingly, it has been found that the above-mentioned object is achieved by a process for the preparation of polyether carbonate polyols from one or more H-functional starter substances, one or more alkylene oxides and carbon dioxide in the presence of a DMC catalyst and in the presence of at least one additive A), characterized in that (α) the H-functional starter substance or a mixture of at least two H-functional starter substances is initially introduced into the reaction vessel and, where appropriate, water and/or other readily volatile compounds are removed by elevated temperature and/or reduced pressure ("drying"), the DMC catalyst being added to the H-functional starter substance or the mixture of at least two H-functional starter substances before or after the drying, (β) for the activation, a part amount (based on the total amount of the amount of alkylene oxides employed in the activation and copolymerization) of one or more alkylene oxides is added to the mixture resulting from step (α), it being possible for this addition of a part amount of alkylene oxide optionally to be carried out in the presence of $CO_2$, and the temperature peak ("hot spot") which occurs due to the subsequent exothermic chemical reaction and/or a drop in pressure in the reactor then in each case being awaited, and it also being possible for step (β) to be carried out several times for the activation, (γ) one or more alkylene oxides and carbon dioxide are metered continuously into the mixture resulting from step (β) ("copolymerization"), it being possible for the alkylene oxides employed for the copolymerization to be identical to or different from the alkylene oxides employed in the activation, wherein the additive A) is added in step (α) to the H-functional starter substance or the mixture of at least two H-functional starter substances, optionally before or after the drying, and/or the additive A) is added in step (β) to the part amount of one or more alkylene oxides to the mixture resulting from step (α), and wherein the additive A) is at least one compound chosen from the group consisting of sterically non-hindered phenols, catechols, pyrocatechols, thiazines, phenothiazines, thiazoles, benzothiazoles, oxazines, phenoxazines, 2,2,6,6-tetramethylpiperidine 1-oxyl and nitrostyrenes.

In the activation step, a part amount of alkylene oxide compound, optionally in the presence of $CO_2$, is added to the DMC catalyst, a temperature peak ("hot spot") and/or a drop in pressure in the reactor being observed due to a subsequent exothermic chemical reaction. In the activation step of the process according to the invention, the part amount of alkylene oxide compound can also contain one or more additives A), and the DMC catalyst can be mixed with one or more additives A) and optionally with one or more metal salts. The process step of activation is the time span from the addition of the part amount of alkylene oxide compound, optionally in the presence of $CO_2$, to the DMC catalyst up to the hot spot. In general, a step for drying the DMC catalyst, optionally one or more of the additives A) and optionally one or more metal salts and optionally the starter by elevated temperature and/or reduced pressure can precede the activation step, this step of drying not being part of the activation step in the context of the present invention.

Possible additives A) are, preferably, sterically non-hindered phenols (A-1) according to formula (II)

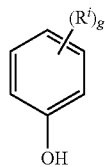

(II)

wherein
g=0, 1, 2, preferably 1 or 2, and
$R^i$ represents an amino, bromo, chloro, cyano, fluoro, iodo, methoxy, methyl or nitro group, preferably a nitro group.

Preferably, the substituent or substituents $R^i$ are arranged in the ortho position relative to the hydroxyl group. Particularly preferably, the sterically non-hindered phenols are 4-dinitrophenol and/or 2,4-dinitrophenol.

Possible additives A) are also, preferably, catechols according to formula (IIIa) and pyrocatechols according to formula (IIIb)

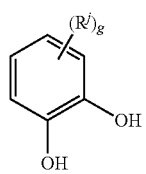

(IIIa)

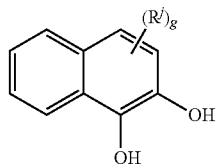

(IIIb)

wherein
g has the above-mentioned meaning and
$R^j$ represents an acetamido, amino, bromo, n-butyl, iso-butyl, tert-butyl, chloro, cyano, ethoxy, ethyl, fluoro, iodo, methoxy, methyl, nitro, iso-propyl, n-propyl group.
Preferably, the pyrocatechols are 4-tert-butyl-pyrocatechol.

Possible additives A) are also, preferably, thiazines according to formula (IVa) and phenothiazines according to formula (IVb)

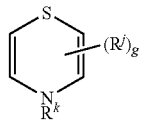

(IVa)

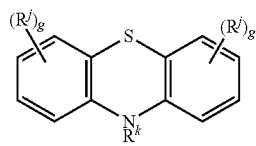

(IVb)

wherein
g and $R^j$ have the above-mentioned meaning, and
$R^k$ represents an H or a $C_1$-$C_{20}$-alkyl group, preferably H or a methyl, ethyl, iso-propyl, n-propyl, n-butyl, iso-butyl, tert-butyl, hexyl, cyclohexyl group.

Possible additives A) are also, preferably, thiazoles according to formula (Va) and benzothiazoles according to formula (Vb)

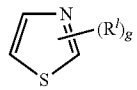

(Va)

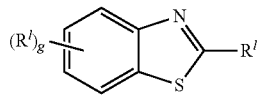

(Vb)

wherein
g has the above-mentioned meaning, and
$R^l$ represents an H, $C_1$-$C_{20}$-alkyl group (for example methyl, ethyl, iso-propyl, n-propyl, n-butyl, iso-butyl, tert-butyl, hexyl, cyclohexyl group), acetamido, amino, bromo, chloro, cyano, ethoxy, ethyl, fluoro, hydroxyl, iodo, methoxy, nitro group. It is furthermore possible for the thiazole and/or the benzothiazole fragments to be linked to one another via disulfide bridges.

Possible additives A) are also, preferably, oxazines according to formula (VIa) and phenoxazines according to formula (VIb)

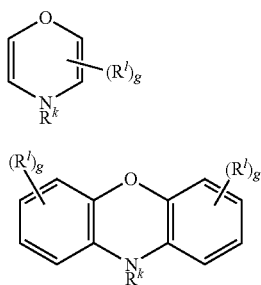

wherein
g, $R^k$ and $R^j$ have the above-mentioned meaning, and
wherein in the case of the 1,4-oxazines according to the formula (VIa), these can also be the corresponding 1,2-oxazines and/or 1,3-oxazines, and the derivatives of 1,4-oxazine (formula (VIa)) are preferred.

Possible additives A) are also nitrostyrenes, such as, for example, α-nitrostyrene or β-nitrostyrene, particularly preferably trans-β-nitrostyrene.

Surprisingly, it has furthermore been found that a favourable selectivity (i.e. low ratio of cyclic carbonate to linear polyether carbonate), a short activation time and at the same time a high content of incorporated $CO_2$ is achieved in the resulting polyether carbonate polyol by a process for the preparation of polyether carbonate polyols from one or more H-functional starter substances, one or more alkylene oxides and carbon dioxide in the presence of a DMC catalyst and in the presence of at least one additive A) and in the presence of at least one metal salt B), characterized in that (α) the H-functional starter substance or a mixture of at least two H-functional starter substances is initially introduced into the reaction vessel and, where appropriate, water and/or other readily volatile compounds are removed by elevated temperature and/or reduced pressure ("drying"), the DMC catalyst being added to the H-functional starter substance or the mixture of at least two H-functional starter substances before or after the drying, (β) for the activation, a part amount (based on the total amount of the amount of alkylene oxides employed in the activation and copolymerization) of one or more alkylene oxides is added to the mixture resulting from step (α), it being possible for this addition of a part amount of alkylene oxide optionally to be carried out in the presence of $CO_2$, and the temperature peak ("hot spot") which occurs due to the subsequent exothermic chemical reaction and/or a drop in pressure in the reactor then in each case being awaited, and it also being possible for step (β) to be carried out several times for the activation, (γ) one or more alkylene oxides and carbon dioxide are added to the mixture resulting from step (β) ("copolymerization"), it being possible for the alkylene oxides employed for the copolymerization to be identical to or different from the alkylene oxides employed in the activation, wherein the additive A) is added in step (α) to the H-functional starter substance or the mixture of at least two H-functional starter substances, optionally before or after the drying, and/or the additive A) is added in step (β) to the part amount of one or more alkylene oxides to the mixture resulting from step (α), wherein the metal salt B) is added in step (α) to the H-functional starter substance or the mixture of at least two H-functional starter substances before or after the drying (optionally together with the additive A), wherein at least one compound chosen from the group consisting of sterically non-hindered phenols, catechols, pyrocatechols, thiazines, phenothiazines, thiazoles, benzothiazoles, 2,2,6,6-tetramethylpiperidine 1-oxyl and nitro styrenes is employed as the additive A) and wherein at least one compound chosen from the group consisting of alkaline earth metal halides (such as, for example, magnesium chloride), alkaline earth metal carboxylates (such as, for example, magnesium acetate, calcium acetate, magnesium stearate, calcium stearate) or aluminium carboxylates (such as, for example, aluminium stearate) is employed as the metal salt B).

Alkaline earth metals in the context of the invention are the elements of group 2 of the periodic table of the elements and include the elements beryllium (Be), magnesium (Mg), calcium (Ca), strontium (Sr), barium (Ba) and radium (Ra).

Halides are the anions of the elements of group 17 of the periodic table of the elements and include the anions fluoride, chloride, bromide, iodide and astatine.

Carboxylates in the context of this invention are anions of carboxylic acids which contain at least one carboxylate group.

The carboxylates contain, for example, only one carboxylate group according to formula (VII)

wherein $R^1$ represents H, $C_1$ to $C_{30}$-alkyl (such as, for example, $CH_3$, $CH_3$—$CH_2$, $CH_3$—$CH_2$—$CH_2$, $CH_3$—$(CH_2)_3$, $CH_3$—$(CH_2)_4$, $CH_3$—$(CH_2)_5$, $CH_3$—$(CH_2)_6$, $CH_3$—$(CH_2)_7$, $CH_3$—$(CH_2)_8$, $CH_3$—$(CH_2)_{14}$, $CH_3$—$(CH_2)_{16}$ and branched isomers thereof), $C_7$ to $C_{30}$-alkaryl (such as, for example, benzyl) or $C_6$ to $C_{30}$-aryl (such as, for example, phenyl or naphthyl).

The carboxylates can similarly be unsaturated carboxylates, such as, for example, acrylate, methacrylate and unsaturated fatty acid salts, such as oleate (salt of oleic acid), where $R^1$=$CH_3$—$(CH_2)_7$—$CH$=$CH$—$(CH_2)_7$, linolate (salt of linoleic acid), where $R^1$=$CH_3$—$(CH_2)_4$—$CH$=$CH$—$CH_2$—$CH$=$CH$—$(CH_2)_7$, and linolenate (salt of linolenic acid), where $R^1$=$CH_3$—$CH_2$—$CH$=$CH$—$CH_2$—$CH$=$CH$—$CH_2$—$CH$=$CH$—$(CH_2)_7$.

$R^1$ in formula (II) can also be heteroaromatic, such as, for example, in the case of nicotinoate.

The carboxylates can also contain, for example, two carboxylate groups according to formula (VIII)

wherein $R^2$ represents a single bond (in the case of oxalate), $C_1$ to $C_{30}$-alkylene (such as, for example, $CH_2$, $CH_2$—$CH_2$, $(CH_2)_3$, $(CH_2)_4$, $(CH_2)_5$, $(CH_2)_6$, $(CH_2)_7$, —$CH$=$CH$— (in the case of maleate or fumarate)), $C_7$ to $C_{30}$-alkaryl (such as, for example, benzyl) or $C_6$ to $C_{30}$-aryl (such as, for example, phenyl or naphthyl).

The carboxylates can moreover also be substituted by hetero atoms (such as, for example, halogens, such as fluorine, chlorine, bromine, iodine) and/or by one or more functional groups, such as hydroxyl (—OH), amine (primary amino group —$NH_2$, secondary amino group —NH or tertiary amino group —N) or thiol (—SH). Examples of such carboxylates are the salts of hydroxycarboxylic acids, such as glycollate (salt of glycollic acid), lactate (salt of lactic acid), tartrate (salt of tartaric acid), salicylate (salt of salicylic acid). Further examples are the salts of amino acids, such as the salts of alanine, asparagine, aspartic acid, cysteine, glutamine, glutamic acid, glycine, histidine, isoleucine, leucine, lysine, methionine, phenylalanine, proline, serine, threonine, tryptophan, tyrosine and valine. Further examples are the salts of carboxylic acids with a thiol group, such as, for example, the salts of 2-mercaptopropionic acid. Examples of carboxylates with two functional groups are the salts of cysteine (containing an amino group and a thiol group).

Preferably, sterically non-hindered phenols (such as, for example, 4-nitrophenol and/or 2,4-dinitrophenol are employed as the additive A) and alkaline earth metal carboxylates (such as, for example, magnesium acetate, calcium acetate, magnesium stearate, calcium stearate) or aluminium carboxylates (such as, for example, aluminium stearate) are employed as the metal salt B). Particularly preferably, 2,4-dinitrophenol and/or 4-nitrophenol is employed as the additive A) and calcium stearate and/or aluminium stearate is employed as the metal salt B).

The amount stated for the additives A) and optionally the metal salts B) employed is based on the ratio of the substance amount of the additive A) and, respectively, the metal salt B) employed (or the sum of the particular substance amounts employed) with respect to the substance amount of cobalt employed originating from the DMC catalyst (stated as [mmol of additive A]/[mmol of Co]) or [mmol of metal salt B]/[mmol of Co]).

In general, the additives A) can be employed in a total amount of from 0.2 to 10.0 [mmol of additive A)]/[mmol of Co]. Preferably, the additives A) are employed in a total amount of from 0.8 to 4.0 [mmol of additive A)]/[mmol of Co], particularly preferably in a total amount of from 1.2 to 3.0 [mmol of additive A)]/[mmol of Co].

In general, the metal salts B) can each be employed in a total amount of from 0.0 to 10.0 [mmol of metal salt B)]/[mmol of Co]. Preferably, the metal salts B) are employed in a total amount of from 0.8 to 4.0 [mmol of metal salt B)]/[mmol of Co], particularly preferably in a total amount of from 1.2 to 3.0 [mmol of metal salt B)]/[mmol of Co].

Step ($\alpha$):

For the preparation of polyether carbonate polyols by catalytic addition of alkylene oxides (epoxides) and carbon dioxide on to H-functional starter substances (starters) in the presence of the DMC catalysts according to the invention and optionally one or more additives A) and optionally of one or more metal salts B), the H-functional starter substance or a mixture of at least two H-functional starter substances is initially introduced into the reaction vessel and, where appropriate, water and/or other readily volatile compounds are removed. This is carried out, for example, by stripping by means of nitrogen (optionally under reduced pressure) or by distillation in vacuo at temperatures of from 50 to 200° C., preferably 80 to 160° C., particularly preferably at 100 to 140° C. This pretreatment of the starter substance or mixture of starter substances is called drying in the following for simplification.

In this context, the DMC catalyst and one or more additives A) and optionally one or more metal salts B) can be already initially introduced into the reaction vessel in the H-functional starter substance or the mixture of at least two H-functional starter substances, but it is also possible for one or more additives A) and optionally the optionally dried metal salt B) to be added to the DMC catalyst, which has then been dried, only after drying of the H-functional starter substance or the mixture of H-functional starter substances. The DMC catalyst can be added in the solid form or as a suspension in an H-functional starter substance. If the catalyst is added as a suspension, this is preferably added before drying of the H-functional starter substance(s).

Step ($\beta$):

Preferably, the activation ($\beta$) is carried out by a procedure in which ($\beta$1) in a first activation step a first part amount (based on the total amount of the amount of alkylene oxides employed in the activation and copolymerization) of one or more alkylene oxides is added to the mixture resulting from step ($\alpha$), it being possible for this addition of the part amount of alkylene oxide optionally to be carried out in the presence of $CO_2$, but preferably in the absence of $CO_2$, and the temperature peak ("hot spot") which occurs due to the subsequent exothermic chemical reaction and/or a drop in pressure in the reactor then in each case being awaited, ($\beta$2) in a second activation step after the temperature peak reached in the preceding activation step, a second part amount (based on the total amount of the amount of alkylene oxides employed in the activation and copolymerization) of one or more alkylene oxides is added to the mixture resulting from the preceding activation step, it being possible for this addition of the part amount of alkylene oxide optionally to be carried out in the presence of $CO_2$, but preferably in the absence of $CO_2$, and the temperature peak ("hot spot") which occurs due to the subsequent exothermic chemical reaction and/or a drop in pressure in the reactor then in each case being awaited.

($\beta$3) optionally, in a third activation step or further activation steps, after the temperature peak reached in the preceding activation step, step ($\beta$2) is repeated zero to five times, preferably once to four times, particularly preferably exactly once, this addition of the part amount or these additions of the part amounts of alkylene oxide being carried out in the absence of $CO_2$, and the temperature peak ("hot spot") which occurs due to the subsequent exothermic chemical reaction and/or a drop in pressure in the reactor then in each case being awaited, ($\beta$4) optionally, in a further activation step or further activation steps, after the temperature peak reached in the preceding activation step, step ($\beta$3) is repeated once to five times, preferably once to four times, particularly preferably exactly once, this addition of the part amount or these additions of the part amounts of alkylene oxide being carried out in the presence of $CO_2$, and wherein the temperature peak ("hot spot") which occurs due to the subsequent exothermic chemical reaction and/or a drop in pressure in the reactor then in each case being awaited.

It is also possible for the additive A) to be dissolved in the particular part amount of one or more alkylene oxides which is employed in steps ($\beta$1) to ($\beta$4) and to be added to the process.

In a preferred embodiment, the particular part amount of one or more alkylene oxides which is employed in the activation in steps $\beta$1 to $\beta$4 is 2.0 to 15.0 wt. %, preferably 2.5 to 14.0 wt. %, particularly preferably 3.0 to 13.0 wt. % (based on the total amount of the amount of alkylene oxides employed in the activation and copolymerization).

The metering of one or more alkylene oxides and optionally of the carbon dioxide is carried out after the drying of a starter substance or the mixture of several starter substances and the addition of the DMC catalyst and/or of the additive A) and optionally of the metal salt B), which is added as a solid or, in the case of the DMC catalyst in the form of a suspension, before or after the drying of the starter substance. If the DMC catalyst and/or the additive A) and optionally the metal salt B) is added after the drying of the starter substance, this DMC catalyst and/or the metal salt B) should preferably be dried, for example in a process analogous to the drying of the starter substance. The metering of one or more alkylene oxides and of the carbon dioxide can in principle be carried out in various ways. The start of the metering can take place from a vacuum or under a previously selected prepressure. The prepressure is preferably established by passing in an inert gas, such as, for example, nitrogen, the pressure (absolute) being established at between 10 mbar to 10 bar, preferably 100 mbar to 8 bar and preferably 500 mbar to 6 bar. In a particularly preferred embodiment, the mixture of one or more starter compounds and the DMC catalyst resulting from step (α) is charged, at a temperature of from 100° C. to 130° C., at least once, preferably three times, with 1.5 bar to 10 bar (absolute), particularly preferably 3 bar to 6 bar (absolute), of an inert gas (nitrogen or a noble gas, such as, for example, argon) and each time immediately subsequently to within 15 min the increased pressure is reduced to approx. 1 bar (absolute). Alternatively, in a similarly particularly preferred embodiment, an inert gas (nitrogen or a noble gas, such as, for example, argon) is passed into the mixture resulting from step (α) at a temperature of from 40 to 150° C., and at the same time a reduced pressure (absolute) of from 10 mbar to 800 mbar, particularly preferably from 50 mbar to 200 mbar, is applied.

Step (γ):

The metering of one or more alkylene oxides and of the carbon dioxide can be carried out simultaneously or sequentially, it being possible for the total amount of carbon dioxide to be added all at once or by metering over the reaction time. Preferably, the carbon dioxide is metered. The metering of one or more alkylene oxides is carried out simultaneously with or sequentially to the carbon dioxide metering. If several alkylene oxides are employed for synthesis of the polyether carbonate polyols, metering thereof can be carried out simultaneously or sequentially via in each case separate metering operations (additions), or via one or more metering operations, at least two alkylene oxides being metered as a mixture. Via the nature of the metering of the alkylene oxides and of the carbon dioxide, it is possible to synthesize random, alternating, block-like or gradient-like polyether carbonate polyols. The concentration of free alkylene oxides during the reaction in the reaction mixture is preferably >0 to 40 wt. %, particularly preferably >0-25 wt. %, most preferably >0-15 wt. % (in each case based on the weight of the reaction mixture).

Preferably, an excess of carbon dioxide, based on the calculated amount of carbon dioxide incorporated in the polyether carbonate polyol, is employed, since due to the slowness of carbon dioxide to react an excess of carbon dioxide is advantageous. The amount of carbon dioxide can be determined via the overall pressure under the particular reaction conditions. The range of from 1 to 120 bar, preferably 50 to 110 bar, particularly preferably from 70 to 100 bar has proved to be advantageous as the overall pressure (absolute) for the copolymerization for the preparation of the polyether carbonate polyols. It has furthermore been found for the process according to the invention that the copolymerization for the preparation of the polyether carbonate polyols is advantageously carried out at 50 to 150° C., preferably at 60 to 145° C., particularly preferably at 70 to 140° C. and very particularly preferably at 110 to 120° C. If temperatures below 50° C. are established, the reaction ceases. At temperatures above 150° C. the amount of undesirable by-products increases greatly. It is furthermore to be ensured that under the choice of pressure and temperature $CO_2$ passes from the gaseous state as far as possible into the liquid and/or supercritical liquid state. However, $CO_2$ can also be added to the reactor as a solid and can then pass into the liquid and/or supercritical liquid state under the reaction conditions chosen.

Particularly preferred reactors are: tube reactor, stirred tank and loop reactor. Polyether carbonate polyols can be prepared in a stirred tank, it being possible for the stirred tank to be cooled via the reactor jacket, internal cooling surfaces and/or cooling surfaces in a pumped circulation, depending on the embodiment and mode of operation. For safety reasons, the content of free epoxide in the reaction mixture of the stirred tank should not exceed 15 wt. % (see, for example, WO-A 2004/081082; page 3; line 14). Both in the semi-batch procedure, where the product is removed only after the end of the reaction, and in the continuous procedure, where the product is removed continuously, attention is therefore to be paid in particular to the metering rate of the epoxide. It is to be adjusted such that in spite of the inhibiting action of the carbon dioxide, the epoxide reacts sufficiently rapidly. It is possible to feed in the carbon dioxide continuously or discontinuously. This depends on whether the epoxide is consumed rapidly enough and whether the product is optionally to contain $CO_2$-free polyether blocks. The amount of carbon dioxide (stated as the pressure) can equally be varied during the addition of the epoxide. It is possible gradually to increase or to lower or to leave constant the $CO_2$ pressure during the addition of the epoxide.

A further possible embodiment in the stirred tank for the copolymerization (step γ) is characterized in that one or more H-functional starter compounds are metered continuously into the reactor during the reaction, where the additive A) employed and the metal salt B) optionally employed can be fed to the process together with the starter or are already initially introduced completely into the reaction vessel at the start of the reaction. The amount of H-functional starter compounds which are metered continuously into the reactor during the reaction is preferably at least 20 equivalent mol %, particularly preferably 70 to 95 equivalent mol % (in each case based on the total amount of H-functional starter compounds) (continuous addition of starter; CAOS process). However, it is not necessary to add the starter in portions. It can also already be initially introduced completely into the reaction vessel at the start of the reaction.

The activated catalyst/starter mixture can be (further) copolymerized with epoxide and carbon dioxide in the stirred tank, but also in another reaction container (tube reactor or loop reactor).

In the case of a tube reactor, the activated catalyst and starter and the epoxide and carbon dioxide are pumped continuously through a tube. The molar ratios of the reaction partners vary according to the desired polymer. In a preferred embodiment, carbon dioxide is metered in here in its supercritical form, that is to say virtually liquid form, in order to render possible a better miscibility of the components. Advantageously, mixing elements are installed for better thorough mixing of the reaction partners, such as are marketed, for example, by Ehrfeld Mikrotechnik BTS GmbH, or mixer-heat exchanger elements which simultaneously . . . the . . . . In fact, it is often not possible in apparatus terms to improve turbulent flow conditions with good thorough mixing and removal of heat.

Even loop reactors can be used for the preparation of polyether carbonate polyols. These include, in general, reactors. These are tube reactors with recycling of substances, such as, for example, a jet loop reactor, which can also be operated continuously, or a loop of tube reactors. The use of a loop reactor is of advantage in particular because back-mixing can be realized here, so that the epoxide concentration should be low. In order to realize complete conversion, a tube ("dwell tube") is often installed downstream.

The polyether carbonate polyols obtained according to the invention have a functionality of at least 1, preferably of from 1 to 8, particularly preferably from 1 to 6 and very particularly preferably from 2 to 4. The molecular weight is preferably 400 to 20,000 g/mol and particularly preferably 500 to 10,000 g/mol.

Generally, alkylene oxides having 2-24 carbon atoms can be employed for the process according to the invention. The alkylene oxides having 2-24 carbon atoms are, for example, one or more compounds chosen from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, mono- or polyepoxidized fats as mono-, di- and triglycerides, epoxidized fatty acids, $C_1$-$C_{24}$ esters of epoxidized fatty acids, epichlorohydrin, glycidol and derivatives of glycidol, such as, for example, methyl glycidyl ether, ethyl glycidyl ether, 2-ethylhexyl glycidyl ether, allyl glycidyl ether, glycidyl methacrylate, and epoxide-functional alkyloxysilanes, such as, for example, 3-glycidyloxypropyltrimethoxysilane, 3-glycidyloxypropyltriethoxysilane, 3-glycidyloxypropyl-tripropoxysilane, 3-glycidyloxypropylmethyldimethoxysilane, 3-glycidyloxypropylethyl-diethoxysilane and 3-glycidyloxypropyltriisopropoxysilane. Preferably, ethylene oxide and/or propylene oxide, in particular propylene oxide, are employed as alkylene oxides.

Compounds with H atoms which are active for the alkoxylation can be employed as a suitable H-functional starter substance. Groups which have active H atoms and are active for the alkoxylation are, for example, —OH, —NH$_2$ (primary amines), —NH— (secondary amines), —SH, and —CO$_2$H, and —OH and —NH$_2$ are preferred and —OH is particularly preferred. The H-functional starter substance employed is, for example, one or more compounds chosen from the group consisting of monofunctional alcohols, polyfunctional alcohols, polyfunctional amines, polyfunctional thiols, amino alcohols thioalcohols, hydroxy esters, polyether polyols, polyester polyols, polyester ether polyols, polyether carbonate polyols, polycarbonate polyols, polyethyleneimines, polyether-amines (e.g. so-called Jeffamine® from Huntsman, such as e.g. D-230, D-400, D-2000, T-403, T-3000, T-5000 or corresponding products of BASF, such as e.g. Polyetheramin D230, D400, D200, T403, T5000), polytetrahydrofurans (e.g. PolyTHF® of BASF, such as e.g. PolyTHF® 250, 650S, 1000, 1000S, 1400, 1800, 2000), polytetrahydrofuranamines (BASF product Polytetrahydrofuranamin 1700), polyether thiols, polyacrylate polyols, castor oil, the mono- or diglyceride of ricinoleic acid, monoglycerides of fatty acids, chemically modified mono-, di and/or triglycerides of fatty acids, and $C_1$-$C_{24}$-alkyl fatty acid esters which contain on average at least 2 OH groups per molecule. By way of example, the $C_1$-$C_{24}$-alkyl fatty acid esters which contain on average at least 2 OH groups per molecule are commercial products such as Lupranol Balance® (BASF AG), Merginol® types (Hobum Oleochemicals GmbH), Sovermol® types (Cognis Deutschland GmbH & Co. KG) and Soyol®TM types (USSC Co.).

Monofunctional starter compounds which can be employed are alcohols, amines, thiols and carboxylic acids. Monofunctional alcohols which can be used are: methanol, ethanol, 1-propanol, 2-propanol, 1-butanol, 2-butanol, tert-butanol, 3-buten-1-ol, 3-butyn-1-ol, 2-methyl-3-buten-2-ol, 2-methyl-3-butyn-2-ol, propargyl alcohol, 2-methyl-2-propanol, 1-tert-butoxy-2-propanol, 1-pentanol, 2-pentanol, 3-pentanol, 1-hexanol, 2-hexanol, 3-hexanol, 1-heptanol, 2-heptanol, 3-heptanol, 1-octanol, 2-octanol, 3-octanol, 4-octanol, phenol, 2-hydroxybiphenyl, 3-hydroxybiphenyl, 4-hydroxybiphenyl, 2-hydroxypyridine, 3-hydroxypyridine, 4-hydroxypyridine. Possible monofunctional amines are: butylamine, tert-butylamine, pentylamine, hexylamine, aniline, aziridine, pyrrolidine, piperidine, morpholine. Monofunctional thiols which can be used are: ethanethiol, 1-propanethiol, 2-propanethiol, 1-butanethiol, 3-methyl-1-butanethiol, 2-butene-1-thiol, thiophenol. Monofunctional carboxylic acids which may be mentioned are: formic acid, acetic acid, propionic acid, butyric acid, fatty acids, such as stearic acid, palmitic acid, oleic acid, linoleic acid, linolenic acid, benzoic acid, acrylic acid.

Polyfunctional alcohols which are suitable as H-functional starter substances are, for example, difunctional alcohols (such as, for example, ethylene glycol, diethylene glycol, propylene glycol, dipropylene glycol, 1,3-propanediol, 1,4-butanediol, 1,4-butenediol, 1,4-butynediol, neopentyl glycol, 1,5-pentanediol, methylpentanediols (such as, for example, 3-methyl-1,5-pentanediol), 1,6-hexanediol, 1,8-octanediol, 1,10-decanediol, 1,12-dodecanediol, bis-(hydroxymethyl)-cyclohexanes (such as, for example, 1,4-bis-(hydroxymethyl) cyclohexane), triethylene glycol, tetraethylene glycol, polyethylene glycols, dipropylene glycol, tripropylene glycol, polypropylene glycols, dibutylene glycol and polybutylene glycols); trifunctional alcohols (such as, for example, trimethylolpropane, glycerol, trishydroxyethyl isocyanurate, castor oil); tetrafunctional alcohols (such as, for example, pentaerythritol); polyalcohols (such as, for example, sorbitol, hexitol, sucrose, starch, starch hydrolysates, cellulose, cellulose hydrolysates, hydroxy-functionalized fats and oils, in particular castor oil), and all modification products of these above-mentioned alcohols with various amounts of ε-caprolactone.

The polyether polyols in particular behave in an advantageous manner in the activation. The H-functional starter substances can also be chosen from the substance class of polyether polyols, in particular those with a molecular weight Mn in the range of from 100 to 4,000 g/mol. Polyether polyols which are built up from recurring ethylene oxide and propylene oxide units are preferred, preferably with a content of from 35 to 100% of propylene oxide units, particularly preferably with a content of from 50 to 100% of propylene oxide units. These can be random copolymers, gradient copolymers or alternating or block copolymers of ethylene oxide and propylene oxide. Suitable polyether polyols built up from recurring propylene oxide and/or ethylene oxide units are, for example, the Desmophen®, Acclaim®, Arcol®, Baycoll®, Bayfill®, Bayflex®, Baygal®, PET® and polyether polyols of Bayer MaterialScience AG (such as e.g. Desmophen® 3600Z, Desmophen® 1900U, Acclaim® Polyol 2200, Acclaim® Polyol 40001, Arcol® Polyol 1004, Arcol® Polyol 1010, Arcol® Polyol 1030, Arcol® Polyol 1070, Baycoll® BD 1110, Bayfill® VPPU 0789, Baygal® K55, PET® 1004, Polyether® S180). Further suitable homo-polyethylene oxides are, for example, the Pluriol® E brands of BASF SE, suitable homo-polypropylene oxides are, for example, the Pluriol® P brands of BASF SE, and suitable mixed copolymers of ethylene oxide and propylene oxide are, for example, the Pluronic® PE or Pluriol® RPE brands of BASF SE.

The H-functional starter substances can also be chosen from the substance class of polyester polyols, in particular those with a molecular weight Mn in the range of from 200 to 4,500 g/mol. At least difunctional polyesters are employed as polyester polyols. Polyester polyols preferably comprise alternating acid and alcohol units. Acid components which are employed are e.g. succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride or mixture of the acids and/or anhydrides mentioned. Alcohol components which are used are e.g. ethanediol, 1,2-propanediol, 1,3-propanediol, 1,4-butanediol, 1,5-pentanediol, neopentyl glycol, 1,6-hexanediol, 1,4-bis-(hydroxymethyl)-cyclohexane, diethylene glycol, dipropylene glycol trimethylolpropane, glycerol, pentaerythritol or mixtures of the alcohols mentioned. If difunctional or polyfunctional polyether polyols are employed as the alcohol component, polyester ether polyols, which can likewise serve as starter substances for the preparation of the polyether carbonate polyols, are obtained. Preferably, polyether polyols with Mn=150 to 2,000 g/mol are employed for the preparation of the polyester-ether polyols.

Polycarbonate diols can furthermore be employed as H-functional starter substances, in particular those with a molecular weight Mn in the range of from 150 to 4,500 g/mol, preferably 500 to 2,500, which are prepared, for example, by reaction of phosgene, dimethyl carbonate, diethyl carbonate or diphenyl carbonate and difunctional alcohols or polyester polyols or polyether polyols. Examples of polycarbonates are to be found e.g. in EP-A 1359177. For example, the Desmophen® C types of Bayer MaterialScience AG, such as e.g. Desmophen® C 1100 or Desmophen® C 2200, can be used as polycarbonate diols.

In a further embodiment of the invention, polyether carbonate polyols can be employed as H-functional starter substances. In particular, polyether carbonate polyols which are obtainable by the process according to the invention described here are employed. These polyether carbonate polyols employed as H-functional starter substances are prepared beforehand for this in a separate reaction step.

The H-functional starter substances in general have a functionality (i.e. number of H atoms per molecule which are active for the polymerization) of from 1 to 8, preferably of 2 or 3. The H-functional starter substances are employed either individually or as a mixture of at least two H-functional starter substances.

Preferred H-functional starter substances are alcohols of the general formula (IX)

HO—(CH$_2$)$_x$—OH     (IX)

wherein x is a number from 1 to 20, preferably an even number from 2 to 20. Examples of alcohols according to formula (IV) are ethylene glycol, 1,4-butanediol, 1,6-hexanediol, 1,8-octanediol, 1,10-decanediol and 1,12-dodecanediol. Further preferred H-functional starter substances are neopentyl glycol, trimethylolpropane, glycerol, pentaerythritol, reaction products of the alcohols according to formula (IX) with ε-caprolactone, e.g. reaction products of trimethylolpropane with ε-caprolactone, reaction products of glycerol with ε-caprolactone and reaction products of pentaerythritol with E-caprolactone. H-functional starter substances which are furthermore preferably employed are water, diethylene glycol, dipropylene glycol, castor oil, sorbitol and polyether polyols built up from recurring polyalkylene oxide units.

The H-functional starter substances are particularly preferably one or more compounds chosen from the group consisting of ethylene glycol, propylene glycol, 1,3-propanediol, 1,3-butanediol, 1,4-butanediol, 1,5-pentanediol, 2-methylpropane-1,3-diol, neopentyl glycol, 1,6-hexanediol, 1,8-octanediol, diethylene glycol, dipropylene glycol, glycerol, trimethylolpropane, di- and trifunctional polyether polyols, wherein the polyether polyol is built up from a di- or tri-H-functional starter substance and propylene oxide or a di- or tri-H-functional starter substance, propylene oxide and ethylene oxide. The polyether polyols preferably have a molecular weight Mn in the range of from 62 to 4,500 g/mol and a functionality of from 2 to 3, and in particular a molecular weight Mn in the range of from 62 to 3,000 g/mol and a functionality of from 2 to 3.

The preparation of the polyether carbonate polyols is carried out by catalytic addition of carbon dioxide and alkylene oxides on to H-functional starter substances. In the context of the invention, "H-functional" is understood as meaning the number of H atoms per molecule of the starter compound which are active for the alkoxylation.

DMC catalysts for use in the homopolymerization of epoxides are known in principle from the prior art (see e.g. U.S. Pat. Nos. 3,404,109, 3,829,505, 3,941,849 and 5,158, 922). DMC catalysts, which are described e.g. in U.S. Pat. No. 5,470,813, EP-A 700 949, EP-A 743 093, EP-A 761 708, WO 97/40086, WO 98/16310 and WO 00/47649, have a very high activity in the homopolymerization of epoxides and render possible the preparation of polyether polyols at very low catalyst concentrations (25 ppm or less), so that in general it is no longer necessary to separate off the catalyst from the finished product. The highly active DMC catalysts described in EP-A 700 949, which, in addition to a double metal cyanide compound (e.g. zinc hexacyanocobaltate(III)) and an organic complexing ligand (e.g. tert-butanol), also contain a polyether with a number-average molecular weight of greater than 500 g/mol, are a typical example.

The DMC catalysts according to the invention are obtained by a procedure in which (i) in the first step an aqueous solution of a metal salt is reacted with the aqueous solution of a metal cyanide salt in the presence of one or more organic complexing ligands, e.g. of an ether or alcohol, (ii) wherein in the second step the solid is separated off by known techniques (such as centrifugation or filtration) from the suspension obtained from (i), (iii) wherein, if appropriate, in a third step the solid which has been isolated is washed with an aqueous solution of an organic complexing ligand (e.g. by resuspending and subsequent renewed isolation by filtration or centrifugation), (iv) wherein the solid obtained, if appropriate after pulverization, is subsequently dried at temperatures of in general 20-120° C. and under pressures of from in general 0.1 mbar to normal pressure (1013 mbar), and wherein in the first step or immediately after the precipitation of the double metal cyanide compound (second step), one or more organic complexing ligands, preferably in excess (based on the double metal cyanide compound), and optionally further complexing components are added.

The double metal cyanide compounds contained in the DMC catalysts according to the invention are the reaction products of water-soluble metal salts and water-soluble metal cyanide salts.

For example, an aqueous solution of zinc chloride (preferably in excess, based on the metal cyanide salt, such as, for example, potassium hexacyanocobaltate) and potassium hexacyanocobaltate is mixed and dimethoxyethane (glyme) or tert-butanol (preferably in excess, based on zinc hexacyanocobaltate) is then added to the suspension formed.

Metal salts which are suitable for the preparation of the double metal cyanide compounds preferably have the general formula (X)

$$M(X)_n \qquad (X)$$

wherein
M is chosen from the metal cations $Zn^{2+}$, $Fe^{2+}$, $Ni^{2+}$, $Mn^{2+}$, $Co^{2+}$, $Sr^{2+}$, $Sn^{2+}$, $Pb^{2+}$ and $Cu^{2+}$, preferably M is $Zn^{2+}$, $Fe^{2+}$, $Co^{2+}$ or $Ni^{2+}$,
X are one or more (i.e. different) anions, preferably an anion chosen from the group of halides (i.e. fluoride, chloride, bromide, iodide), hydroxide, sulfate, carbonate, cyanate, thiocyanate, isocyanate, isothiocyanate, carboxylate, oxalate and nitrate;
n is 1 if X=sulfate, carbonate or oxalate and
n is 2 if X=halide, hydroxide, carboxylate, cyanate, thiocyanate, isocyanate, isothiocyanate or nitrate,
or suitable metal salts have the general formula (XI)

$$M_r(X)_3 \qquad (XI)$$

wherein
M is chosen from the metal cations $Fe^{3+}$, $Al^{3+}$, $Co^{3+}$ and $Cr^{3+}$,
X are one or more (i.e. different) anions, preferably an anion chosen from the group of halides (i.e. fluoride, chloride, bromide, iodide), hydroxide, sulfate, carbonate, cyanate, thiocyanate, isocyanate, isothiocyanate, carboxylate, oxalate and nitrate;
r is 2 if X=sulfate, carbonate or oxalate and
r is 1 if X=halide, hydroxide, carboxylate, cyanate, thiocyanate, isocyanate, isothiocyanate or nitrate,
or suitable metal salts have the general formula (XII)

$$M(X)_s \qquad (XII)$$

wherein
M is chosen from the metal cations $Mo^{4+}$, $V^{4+}$ and $W^{4+}$
X are one or more (i.e. different) anions, preferably an anion chosen from the group of halides (i.e. fluoride, chloride, bromide, iodide), hydroxide, sulfate, carbonate, cyanate, thiocyanate, isocyanate, isothiocyanate, carboxylate, oxalate and nitrate;
s is 2 if X=sulfate, carbonate or oxalate and
s is 4 if X=halide, hydroxide, carboxylate, cyanate, thiocyanate, isocyanate, isothiocyanate or nitrate,
or suitable metal salts have the general formula (XIII)

$$M(X)_t \qquad (XIII)$$

wherein
M is chosen from the metal cations $Mo^{6+}$ and $W^{6+}$
X are one or more (i.e. different) anions, preferably an anion chosen from the group of halides (i.e. fluoride, chloride, bromide, iodide), hydroxide, sulfate, carbonate, cyanate, thiocyanate, isocyanate, isothiocyanate, carboxylate, oxalate and nitrate;
t is 3 if X=sulfate, carbonate or oxalate and
t is 6 if X=halide, hydroxide, carboxylate, cyanate, thiocyanate, isocyanate, isothiocyanate or nitrate.

Examples of suitable metal salts are zinc chloride, zinc bromide, zinc iodide, zinc acetate, zinc acetylacetonate, zinc benzoate, zinc nitrate, iron(II) sulfate, iron(II) bromide, iron(II) chloride, iron(III) chloride, cobalt(II) chloride, cobalt(II) thiocyanate, nickel(II) chloride and nickel(II) nitrate. Mixtures of various metal salts can also be employed.

Metal cyanide salts which are suitable for the preparation of the double metal cyanide compounds preferably have the general formula (XIV)

$$(Y)_a M'(CN)_b (A)_c \qquad (XIV)$$

wherein
M' is chosen from one or more metal cations of the group consisting of Fe(II), Fe(III), Co(II), Co(III), Cr(II), Cr(III), Mn(II), Mn(III), Ir(III), Ni(II), Rh(III), Ru(II), V(IV) and V(V), preferably M' is one or more metal cations of the group consisting of Co(II), Co(III), Fe(II), Fe(III), Cr(III), Ir(III) and Ni(II),
Y is chosen from one or more metal cations of the group consisting of alkali metal (i.e. $Li^+$, $Na^+$, $K^+$, $Rb^+$) and alkaline earth metal (i.e. $Be^{2+}$, $Mg^{2+}$, $Ca^{2+}$, $Sr^{2+}$, $Ba^{2+}$),
A is chosen from one or more anions of the group consisting of halides (i.e. fluoride, chloride, bromide, iodide), hydroxide, sulfate, carbonate, cyanate, thiocyanate, isocyanate, isothiocyanate, carboxylate, azide, oxalate or nitrate and
a, b and c are integers, wherein the values for a, b and c are chosen such that the metal cyanide salt has electroneutrality; a is preferably 1, 2, 3 or 4; b is preferably 4, 5 or 6; c preferably has the value 0.

Examples of suitable metal cyanide salts are sodium hexacyanocobaltate(III), potassium hexacyanocobaltate(III), potassium hexacyanoferrate(II), potassium hexacyanoferrate(III), calcium hexacyanocobaltate(III) and lithium hexacyanocobaltate(III).

Preferred double metal cyanide compounds which the DMC catalysts according to the invention contain are compounds of the general formula (XV)

$$M_x[M'_{x'}(CN)_y]_z \qquad (XV),$$

wherein M is as defined in formula (III) to (VI) and
M' is as defined in formula (VII), and
x, x', y and z are integers and are chosen such that the double metal cyanide compound has electroneutrality.
Preferably
x=3, x'=1, y=6 and z=2,
M=Zn(II), Fe(II), Co(II) or Ni(II) and
M'=Co(III), Fe(III), Cr(III) or Ir(III).

Examples of suitable double metal cyanide compounds are zinc hexacyanocobaltate(III), zinc hexacyanoiridate(III), zinc hexacyanoferrate(III) and cobalt(II) hexacyanocobaltate(III). Further examples of suitable double metal cyanide compounds are to be found e.g. in U.S. Pat. No. 5,158,922 (column 8, lines 29-66). Zinc hexacyanocobaltate(III) is particularly preferably used.

The organic complexing ligands added in the preparation of the DMC catalysts are disclosed, for example, in U.S. Pat. No. 5,158,922 (see in particular column 6, lines 9 to 65), U.S. Pat. Nos. 3,404,109, 3,829,505, 3,941,849, EP-A 700 949, EP-A 761 708, JP 4 145 123, U.S. Pat. No. 5,470,813, EP-A 743 093 and WO-A 97/40086). For example, water-soluble, organic compounds with hetero atoms, such as oxygen, nitrogen, phosphorus or sulfur, which can form complexes with the double metal cyanide compound are employed as organic complexing ligands. Preferred organic complexing ligands are alcohols, aldehydes, ketones, ethers, esters, amides, ureas, nitriles, sulfides and mixtures thereof. Particularly preferred organic complexing ligands are aliphatic ethers (such as dimethoxyethane), water-soluble aliphatic alcohols (such as ethanol, isopropanol, n-butanol, iso-butanol, sec-butanol, tert-butanol, 2-methyl-3-buten-2-ol and 2-methyl-3-butyn-2-ol), and compounds which contain both aliphatic or cycloaliphatic ether groups and aliphatic hydroxyl groups (such as e.g. ethylene glycol mono-tert-butyl ether, diethylene glycol mono-tert-butyl ether, tripropylene glycol monomethyl ether and 3-methyl-3-oxetane-methanol). Organic complexing ligands which are most preferred are chosen from one or more compounds of the group consisting of dimethoxyethane, tert-butanol, 2-methyl-3-buten-2-ol, 2-methyl-3-butyn-2-ol, ethylene glycol mono-tert-butyl ether and 3-methyl-3-oxetane-methanol.

One or more complexing component(s) from the compound classes of polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly(N-vinylpyrrolidone-co-acrylic acid), polyvinyl methyl ketone, poly(-vinylphenol), poly(acrylic acid-co-styrene), oxazoline polymers, polyalkyleneimines, maleic acid and maleic anhydride copolymers, hydroxyethylcellulose and polyacetals, or of glycidyl ethers, glycosides, carboxylic acid esters of polyfunctional alcohols, bile acids or salts, esters or amides thereof, cyclodextrins, phosphorus compounds, $\alpha,\beta$-unsaturated carboxylic acid esters or ionic surface- or interface-active compounds are optionally employed in the preparation of the DMC catalysts according to the invention.

Preferably, in the first step in the preparation of the DMC catalysts according to the invention, the aqueous solutions of the metal salt (e.g. zinc chloride), employed in a stoichiometric excess (at least 50 mol %, based on the metal cyanide salt, that is to say at least a molar ratio of metal salt to metal cyanide salt of 2.25 to 1.00) and of the metal cyanide salt (e.g. potassium hexacyanocobaltate) are reacted in the presence of the organic complexing ligand (e.g. tert-butanol), a suspension which contains the double metal cyanide compound (e.g. zinc hexacyanocobaltate), water, excess metal salt and the organic complexing ligand being formed.

In this context, the organic complexing ligand can be present in the aqueous solution of the metal salt and/or of the metal cyanide salt, or it is added directly to the suspension obtained after precipitation of the double metal cyanide compound. It has proved to be advantageous to mix the aqueous solutions of the metal salt and of the metal cyanide salt and the organic complexing ligand with vigorous stirring. The suspension formed in the first step is then optionally treated with a further complexing component. In this context, the complexing component is preferably employed in a mixture with water and organic complexing ligand. A preferred method for carrying out the first step (i.e. the preparation of the suspension) is carried out employing a mixing nozzle, particularly preferably employing a jet disperser as described in WO-A 01/39883.

In the second step the solid (i.e. the precursor of the catalyst according to the invention) is isolated from the suspension by known techniques, such as centrifugation or filtration.

In a preferred embodiment variant, in a third process step the solid which has been isolated is subsequently washed with an aqueous solution of the organic complexing ligand (e.g. by resuspending and subsequent renewed isolation by filtration or centrifugation). In this manner, for example, water-soluble by-products, such as potassium chloride, can be removed from the catalyst according to the invention. Preferably, the amount of organic complexing ligand in the aqueous washing solution is between 40 and 80 wt. %, based on the total solution.

In the third step, further complexing component is optionally added to the aqueous washing solution, preferably in the range of between 0.5 and 5 wt. %, based on the total solution.

It is moreover advantageous for the solid which has been isolated to be washed more than once. Preferably, washing is carried out in a first washing step (iii-1) with an aqueous solution of the unsaturated alcohol (e.g. by resuspending and subsequent renewed isolation by filtration or centrifugation), in order to remove, for example, water-soluble by-products, such as potassium chloride, from the catalyst according to the invention in this manner. Particularly preferably, the amount of unsaturated alcohol in the aqueous washing solution is between 40 and 80 wt. %, based on the total solution of the first washing step. In the further washing steps (iii-2), either the first washing step is repeated once or several times, preferably once to three times . . . washing operation, or preferably, a . . . will be . . . . It is preferable, however, to use a non-aqueous solution for further washing operations, e.g. a mixture or solution of unsaturated alcohol, of organic complexing ligand and further complexing components (preferably in the range of between 0.5 and 5 wt. %, based on the total amount of the washing solution of step (iii-2)), employed as the washing solution, and the solid . . . washed with this once or several times, preferably once to three times. Components.

The solid which has been isolated and optionally washed is then dried, optionally after pulverization, at temperatures of in general 20-100° C. and under pressures of from in general 0.1 mbar to normal pressure (1013 mbar).

A preferred method for isolating the DMC catalysts according to the invention from the suspension by filtration, washing of the filter cake and drying is described in WO-A 01/80994.

The polyether carbonate polyols obtainable by the process according to the invention have a low content of by-products and can be processed without problems, in particular by reaction with di- and/or polyisocyanates, to give polyurethanes, in particular flexible polyurethane foams. For polyurethane uses, polyether carbonate polyols which are based on an H-functional starter compound which has a functionality of at least 2 are preferably employed. The polyether carbonate polyols obtainable by the process according to the invention can furthermore be used in uses such as detergent and cleaning agent formulations, drilling liquids, fuel additives, ionic and nonionic surfactants, lubricants, process chemicals for papermaking or textile production or cosmetic formulations. It is known to the person skilled in the art that, depending on the particular field of use, the polyether carbonate polyols to be used must comply with certain substance properties, such as, for example, molecular weight, viscosity, polydispersity, functionality and/or hydroxyl number.

EXAMPLES

The weight- and number-average molecular weight of the polymers formed were determined by means of gel permeation chromatography (GPC). The procedure was in accordance with DIN 55672-1: "Gel permeation chromatography, Part 1-Tetrahydrofuran as the eluting agent". Polystyrene samples of known molecular weight were used here for the calibration.

The OH number (hydroxyl number) was determined in accordance with DIN 53240-2, pyridine being used as the solvent, however, instead of THF/methylene chloride. Titration was carried out with 0.5 molar ethanolic KOH (end point detection by means of potentiometry). Castor oil with an OH number specified by certificate functioned as the test substance. The unit stated in "mg/g" relates to mg[KOH]/g[polyether carbonate polyol].

For stating the amount of metal salt employed, the ratio of the substance amount of metal salt employed relative to the substance amount of cobalt employed, originating from the DMC catalyst, is also indicated. A weight content of Co of 11.0 wt. % is used for calculating the substance amount of cobalt originating from the DMC catalyst. This was determined by means of x-ray fluorescence analysis. On this basis, 141 mg of DMC catalyst employed (prepared according to Example 6 of WO-A 01/80994) contain a substance amount of cobalt of 0.26 mmol.

The content of $CO_2$ incorporated in the resulting polyether carbonate polyol and the ratio of propylene carbonate to polyether carbonate polyol were determined by means of $^1$H-NMR (Bruker, DPX 400, 400 MHz; pulse program zg30, waiting time d1: 10 s, 64 scans). The sample was dissolved in deuterated chloroform in each case. The relevant resonances in the $^1$H-NMR (based on TMS=0 ppm) are as follows:
cyclic carbonate (which was formed as a by-product) resonance at 4.5 ppm, carbonate, resulting from carbon dioxide incorporated in the polyether carbonate polyol (resonances at 5.1 to 4.8 ppm), unreacted PO with resonance at 2.4 ppm, polyether polyol (i.e. without incorporated carbon dioxide) with resonances at 1.2 to 1.0 ppm, the 1,8-octanediol incorporated as the starter molecule with a resonance at 1.6 to 1.52 ppm.

The molar content of the carbonate incorporated in the polymer in the reaction mixture is calculated according to formula (XI) as follows, the following abbreviations being used:
A(4.5)=area of the resonance at 4.5 ppm for cyclic carbonate (corresponds to an H atom)
A(5.1-4.8)=area of the resonance at 5.1-4.8 ppm for polyether carbonate polyol and an H atom for cyclic carbonate.
A(2.4)=area of the resonance at 2.4 ppm for free, unreacted PO
A(1.2-1.0)=area of the resonance at 1.2-1.0 ppm for polyether polyol
A(1.6-1.52)=area of the resonance at 1.6 to 1.52 ppm for 1,8-octanediol (starter)

Taking into account the relative intensities, the polymer-bonded carbonate ("linear carbonate" LC) in the reaction mixture was converted into mol % according to the following formula (XVI)

$$LC = \frac{A(5.1-4.8) - A(4.5)}{A(5.1-4.8) + A(2.4) + 0.33*A(1.2-1.0) + 0.25*A(1.6-1.52)} * 100 \quad \text{(XVI)}$$

The weight content (in wt. %) of polymer-bonded carbonate (LC') in the reaction mixture was calculated according to formula (XVII)

$$LC' = \frac{[A(5.1-4.8) - A(4.5)] * 102}{N} * 100\% \quad \text{(XVII)}$$

the value for N ("denominator" N) being calculated according to formula (XVIII):

$$N = [A(5.1-4.8) - A(4.5)] * 102 + A(4.5) * 102 + A(2.4) * 58 + 0.33*A(1.2-1.0)*58 + 0.25*A(1.6-1.52)*146 \quad \text{(XVIII)}$$

The factor 102 results from the sum of the molecular weights of $CO_2$ (molecular weight 44 g/mol) and that of propylene oxide (molecular weight 58 g/mol), the factor 58 results from the molecular weight of propylene oxide and the factor 146 results from the molecular weight of the starter employed, 1,8-octanediol.

The weight content (in wt. %) of cyclic carbonate (CC') in the reaction mixture was calculated according to formula (XIX), $$CC' = \frac{A(4.5) * 102}{N} * 100\% \quad \text{(XIX)}$$

the value for N being calculated according to formula (XI).

In order to calculate from the values of the composition of the reaction mixture the composition based on the polymer content (consisting of polyether polyol, which was built up from the starter and propylene oxide during the activation steps which took place under $CO_2$-free conditions, and polyether carbonate polyol, built up from the starter, propylene oxide and carbon dioxide during the activation steps which took place in the presence of $CO_2$ and during the copolymerization), the non-polymer constituents of the reaction mixture (i.e. cyclic propylene carbonate and any unreacted propylene oxide present) were eliminated by calculation. The weight content of the carbonate recurring units in the polyether carbonate polyol was converted into a weight content of carbon dioxide by means of the factor F=44/(44+58). The $CO_2$ content in the polyether carbonate polyol stated ("$CO_2$ incorporated"; see the following examples and Table 1) is standardized to the content of the polyether carbonate polyol molecule which was formed during the copolymerization and, where appropriate, the activation steps in the presence of $CO_2$ (i.e. the content of the polyether carbonate polyol molecule which results from the starter (1,8-octanediol) and from the reaction of the starter with epoxide which was added under $CO_2$-free conditions was not taken into account here).

Preparation of a Polyether Carbonate Polyol in the Absence of Additives

Comparison Example 1

141 mg of dried DMC catalyst (prepared in accordance with Example 6 of WO-A 01/80994) and 51 g of dried 1,8-octanediol (starter) were initially introduced into a 1 l pressure reactor with a gas metering device. The reactor was heated up to 130° C. and rendered inert by repeated charging with nitrogen to approx. 5 bar and subsequent letting down to approx. 1 bar. This operation was carried out 3 times. 25 g of propylene oxide (PO) were metered into the reactor at 130° C. and in the absence of $CO_2$, that is to say under zero bar of $CO_2$. The start-up of the reaction manifested itself by a temperature peak ("hot spot") and by a drop in pressure to the starting pressure (approx. 1 bar) [activation 1]. After the first drop in pressure, 20 g of PO [activation 2] and then 19 g of PO were metered in rapidly [activation 3], as a result of which in each case a temperature peak and a drop in pressure in turn occurred. After the reactor had been charged with 50 bar of $CO_2$ [pressure 1], 50 g of PO were metered in rapidly [activation 4], as a result of which a temperature peak occurred after a waiting time of 33 minutes [time 1]. From this point in time of the temperature peak, the overall pressure in the reactor tended to decrease. The pressure [pressure 2] in the reactor was regulated such that the pressure was kept constant at the above-mentioned pressure 1 by regular metering in of $CO_2$. After the activation had taken place, the remaining propylene oxide (435 g) was pumped continuously into the reactor at approx. 1.8 g/min, while the temperature was lowered to 105° C. [temperature 1] in steps of 5° C. per five minutes. When the addition of PO had ended, stirring was continued (1,500 rpm) for a further 60 minutes at 105° C. under the above-mentioned pressure 1.

The polyether carbonate polyol prepared in this way is distinguished by the following properties:
$CO_2$ incorporated [wt. %], based on the part of the polymer formed under $CO_2$: 19.9 wt. %;
Selectivity stated as the ratio of cyclic carbonate (undesirable by-product) to polyether carbonate polyol=0.21;
OH number of the polyether carbonate polyol was 67.2 mg/g;
Polydispersity was 1.45.

Preparation of a Polyether Carbonate Polyol with Continuous Addition of 31 g of 2,4,6-Tri-Tert-Butylphenol Comparison Example 2

The preparation was carried out in accordance with the procedure in Comparison Example 1, but [pressure 2] was 60 bar. After the activation had been carried out, a mixture of 435 g of PO and 31 g of 2,4,6-tri-tert-butylphenol, that is to say 461 g in total, was metered in continuously.
[Temperature 1] was 110° C.

The polyether carbonate polyol prepared in this way is distinguished by the following properties:
$CO_2$ incorporated [wt. %], based on the part of the polymer formed under $CO_2$: 20.4 wt. %.
Selectivity stated as the ratio of cyclic carbonate (undesirable by-product) to polyether carbonate polyol remained unchanged at 0.21 (i.e. as in Comparison Example 1).
OH number of the polyether carbonate polyol was 69.1 mg/g;
Polydispersity was poorer (1.65 instead of 1.45).

Preparation of a Polyether Carbonate Polyol in the Presence of a DMC Catalyst and an Organic Additive (Additive A) and Optionally a Metal Salt B (General Preparation Instructions)

141 mg of dried DMC catalyst (prepared in accordance with Example 6 of WO-A 01/80994), where appropriate an additive A (in the nature and amount stated in Table 1) [additive addition A1], where appropriate a metal salt B (in the nature and amount stated in Table 1) [metal salt addition B1] and 51 g of dried 1,8-octanediol (starter) were initially introduced into a 1 l pressure reactor with a gas metering device. The reactor was heated up to 130° C. and rendered inert by repeated charging with nitrogen to approx. 5 bar and subsequent letting down to approx. 1 bar. This operation was carried out three times [drying]. 25 g of propylene oxide (PO) were metered into the reactor at 130° C. and in the absence of $CO_2$, that is to say under zero bar of $CO_2$. Where appropriate the additive A was first added here as a solution in the 25 g of PO [additive addition A2]. The start-up of the reaction manifested itself by a temperature peak ("hot spot") and by a drop in pressure to values close to the starting pressure (approx. 1 bar) [activation 1]. After the first drop in pressure, 20 g of PO [activation 2], which contained the additive A where appropriate [additive addition A3], and then 19 g of PO, which contained the additive A where appropriate [additive addition A4], were metered in rapidly [activation 3], as a result of which in each case a temperature peak and a drop in pressure in turn occurred. After the reactor had been charged with 50 bar of $CO_2$, 50 g of PO were metered in rapidly [activation 4], as a result of which a temperature peak occurred after a waiting time [time 1]. From this point in time of the temperature peak, the overall pressure in the reactor tended to decrease. The pressure in the reactor was regulated such that the pressure was kept constant at the above-mentioned pressure 1 by regular metering in of $CO_2$. After the activation had been carried out, the remaining propylene oxide (435 g) was pumped continuously into the reactor at approx. 1.8 g/min, while the temperature was lowered to 105° C. in steps of 5° C. per five minutes. When the addition of PO had ended, stirring was continued (1,500 rpm) for a further 60 minutes at 105° C. under the above-mentioned pressure.

Preparation of a Polyether Carbonate Polyol in the Presence of 61 Mg of 4-Nitrophenol Example 3

The preparation was carried out in accordance with the general preparation instructions, 4-nitrophenol, as the additive A, being initially introduced into the reaction vessel together with the DMC catalyst and 1,8-octanediol (starter) as a solid [additive addition A1].
The time to the hot spot under $CO_2$ [activation 4] was 6 minutes.

The polyether carbonate polyol prepared in this way is distinguished by the following properties:
$CO_2$ incorporated [wt. %], based on the part of the polymer formed under $CO_2$: 19.3 wt. %;
Selectivity stated as the ratio of cyclic carbonate (undesirable by-product) to polyether carbonate polyol was 0.15;
OH number of the polyether carbonate polyol was 61.3 mg/g;
Polydispersity was 1.40

Preparation of a Polyether Carbonate Polyol in the Presence of 61 Mg of 4-Nitrophenol, Added as a Solution in Propylene Oxide Example 4

The preparation was carried out in accordance with the general preparation instructions, 4-nitrophenol, as the additive A, being dissolved in the amount of propylene oxide used for the activations 1, 2 and 3 and this solution being added accordingly in the activation steps [additive addition A2, A3, A4].
The time to the hot spot under $CO_2$ [activation 4] was 7 minutes.

The polyether carbonate polyol prepared in this way is distinguished by the following properties:
$CO_2$ incorporated [wt. %], based on the part of the polymer formed under $CO_2$: 18.3 wt. %;
Selectivity stated as the ratio of cyclic carbonate (undesirable by-product) to polyether carbonate polyol was 0.19;
OH number of the polyether carbonate polyol was 65.5 mg/g;
Polydispersity was 1.22

Preparation of a Polyether Carbonate Polyol in the Presence of 81 Mg of 2,4-Dinitrophenol Example 5

The preparation was carried out in accordance with the general preparation instructions, 2,4-dinitrophenol, as the additive A, being initially introduced into the reaction vessel together with the DMC catalyst and 1,8-octanediol (starter) as a solid [additive addition A1].

The time to the hot spot under $CO_2$ [activation 4] was 14 minutes.

The polyether carbonate polyol prepared in this way is distinguished by the following properties:
$CO_2$ incorporated [wt. %], based on the part of the polymer formed under $CO_2$: 18.0 wt. %;
Selectivity stated as the ratio of cyclic carbonate (undesirable by-product) to polyether carbonate polyol was 0.16;
OH number of the polyether carbonate polyol was 59.3 mg/g;
Polydispersity was 1.17

Preparation of a Polyether Carbonate Polyol in the Presence of 74 Mg of 4-Tert-Butyl-(Pyro)Catechol Example 6

The preparation was carried out in accordance with the general preparation instructions, 4-tert-butyl-(pyro)catechol, as the additive A, being initially introduced into the reaction vessel together with the DMC catalyst and 1,8-octanediol (starter) as a solid [additive addition A1].

The time to the hot spot under $CO_2$ [activation 4] was 17 minutes.

The polyether carbonate polyol prepared in this way is distinguished by the following properties:
$CO_2$ incorporated [wt. %], based on the part of the polymer formed under $CO_2$: 19.8 wt. %;
Selectivity stated as the ratio of cyclic carbonate (undesirable by-product) to polyether carbonate polyol was 0.18;
OH number of the polyether carbonate polyol was 65.1 mg/g;
Polydispersity was 1.38

Preparation of a Polyether Carbonate Polyol in the Presence of 88 Mg of Phenothiazine Example 7

The preparation was carried out in accordance with the general preparation instructions, phenothiazine, as the additive A, being initially introduced into the reaction vessel together with the DMC catalyst and 1,8-octanediol (starter) as a solid [additive addition A1].

The time to the hot spot under $CO_2$ [activation 4] was shortened from 33 minutes to 6 minutes.

The polyether carbonate polyol prepared in this way is distinguished by the following properties:
$CO_2$ incorporated [wt. %], based on the part of the polymer formed under $CO_2$: 18.6 wt. %;
Selectivity stated as the ratio of cyclic carbonate (undesirable by-product) to polyether carbonate polyol was 0.15;
OH number of the polyether carbonate polyol was 57.8 mg/g;
Polydispersity was 1.30

Preparation of a Polyether Carbonate Polyol in the Presence of 88 Mg of Phenothiazine, Added as a Solution in Propylene Oxide Example 8

The preparation was carried out in accordance with the general preparation instructions, phenothiazine, as the additive A, being added in the amount of propylene oxide used for the activation 1 [additive addition A2].

The time to the hot spot under $CO_2$ [activation 4] was 7 minutes.

The polyether carbonate polyol prepared in this way is distinguished by the following properties:
$CO_2$ incorporated [wt. %], based on the part of the polymer formed under $CO_2$: 17.8 wt. %;
Selectivity stated as the ratio of cyclic carbonate (undesirable by-product) to polyether carbonate polyol was 0.19;
OH number of the polyether carbonate polyol was 64.9;
Polydispersity was 1.19

Preparation of a Polyether Carbonate Polyol in the Presence of 81 Mg of Phenoxazine Example 9

The preparation was carried out in accordance with the general preparation instructions, phenoxazine, as the additive A, being initially introduced into the reaction vessel together with the DMC catalyst and 1,8-octanediol (starter) as a solid [additive addition A1].

The time to the hot spot under $CO_2$ [activation 4] was 21 minutes.

The polyether carbonate polyol prepared in this way is distinguished by the following properties:
$CO_2$ incorporated [wt. %], based on the part of the polymer formed under $CO_2$: 20.8 wt. %;
Selectivity stated as the ratio of cyclic carbonate (undesirable by-product) to polyether carbonate polyol was 0.17;
OH number of the polyether carbonate polyol was 56.7 mg/g;
Polydispersity was 1.40

Preparation of a Polyether Carbonate Polyol in the Presence of 68 Mg of 2,2,6,6-Tetramethylpiperidine 1-oxyl Example 10

The preparation was carried out in accordance with the general preparation instructions, 2,2,6,6-tetramethylpiperidine 1-oxyl (TEMPO), as the additive A, being initially introduced into the reaction vessel together with the DMC catalyst and 1,8-octanediol (starter) as a solid [additive addition A1].

The time to the hot spot under $CO_2$ [activation 4] was 15 minutes.

The polyether carbonate polyol prepared in this way is distinguished by the following properties:
$CO_2$ incorporated [wt. %], based on the part of the polymer formed under $CO_2$: 19.0 wt. %;
Selectivity stated as the ratio of cyclic carbonate (undesirable by-product) to polyether carbonate polyol was 0.16;
OH number of the polyether carbonate polyol was 61.8 mg/g;
Polydispersity was 1.23

Preparation of a Polyether Carbonate Polyol in the Presence of 65 Mg of Trans-β-Nitrostyrene Example 11

The preparation was carried out in accordance with the general preparation instructions, trans-β-nitrostyrene, as the additive A, being initially introduced into the reaction vessel together with the DMC catalyst and 1,8-octanediol (starter) as a solid [additive addition A1].

The time to the hot spot under $CO_2$ [activation 4] was 19 minutes.

The polyether carbonate polyol prepared in this way is distinguished by the following properties:

$CO_2$ incorporated [wt. %], based on the part of the polymer formed under $CO_2$: 19.5 wt. %;
Selectivity stated as the ratio of cyclic carbonate (undesirable by-product) to polyether carbonate polyol was 0.15;
OH number of the polyether carbonate polyol was 62.6 mg/g;
Polydispersity was 1.42

Preparation of a Polyether Carbonate Polyol in the Presence of 52 Mg of 2,2'-Dithiobis(Benzothiazole)

Example 12

The preparation was carried out in accordance with the general preparation instructions, 2,2'-dithiobis(benzothiazole), as the additive A, being initially introduced into the reaction vessel together with the DMC catalyst and 1,8-octanediol (starter) as a solid [additive addition A1].
The time to the hot spot under $CO_2$ [activation 4] was 9 minutes.
The polyether carbonate polyol prepared in this way is distinguished by the following properties:
$CO_2$ incorporated [wt. %], based on the part of the polymer formed under $CO_2$: 19.0 wt. %;
Selectivity stated as the ratio of cyclic carbonate (undesirable by-product) to polyether carbonate polyol was 0.18;
OH number of the polyether carbonate polyol was 64.6 mg/g;
Polydispersity was 1.17

Preparation of a Polyether Carbonate Polyol in the Presence of 52 Mg of α-Methylstyrene Comparison Example 13

The preparation was carried out in accordance with the general preparation instructions, α-methylstyrene, as the additive A, being initially introduced into the reaction vessel together with the DMC catalyst and 1,8-octanediol (starter) as a solid [additive addition A1].
The time to the hot spot under $CO_2$ [activation 4] was 30 minutes.
The polyether carbonate polyol prepared in this way is distinguished by the following properties:
$CO_2$ incorporated [wt. %], based on the part of the polymer formed under $CO_2$: 17.2 wt. %;
Selectivity stated as the ratio of cyclic carbonate (undesirable by-product) to polyether carbonate polyol was 0.22;
OH number of the polyether carbonate polyol was 70.5 mg/g;
Polydispersity was 1.47

Discussion of the Results Examples 1-13 (Table 1)

As can be seen from the results of Comparison Example 2, no significant improvement is found in the context of the invention by using a sterically hindered 2,4,6-tri-tert-butylphenol in an amount of significantly more than at least a 10-fold molar excess.

If the organic additives mentioned in Examples 3-12 are added, the time to the hot spot under carbon dioxide [activation 4] is sometimes shortened significantly, so that less time must be spent in carrying out the reaction. All the organic additives of Examples 3-12 improve the selectivity (cyclic/linear value decreases) and lead to polyether carbonate polyols with a low polydispersity. Advantageously, a higher incorporation of carbon dioxide into the polymer is also achieved with the additive phenoxazine (Example 9).

Other organic substances, such as, for example, α-methylstyrene (Comparison Example 13) are not suitable for achieving the object according to the invention.

Preparation of a Polyether Carbonate Polyol in the Presence of 405 Mg of Calcium Stearate Comparison Example 14

The preparation was carried out in accordance with the general preparation instructions, calcium stearate, as the metal salt B, being initially introduced into the reaction vessel together with the DMC catalyst and 1,8-octanediol (starter) as a solid [metal salt addition B1].
The time to the hot spot under $CO_2$ [activation 4] was 15 minutes.
The polyether carbonate polyol prepared in this way is distinguished by the following properties:
$CO_2$ incorporated [wt. %], based on the part of the polymer formed under $CO_2$: 20.2 wt. %;
Selectivity stated as the ratio of cyclic carbonate (undesirable by-product) to polyether carbonate polyol was 0.10;
OH number of the polyether carbonate polyol was 64.3 mg/g;
Polydispersity was 1.37.

Preparation of a Polyether Carbonate Polyol in the Presence of 390 Mg of Aluminium Stearate Comparison Example 15

The preparation was carried out in accordance with the general preparation instructions, aluminium stearate, as the metal salt B, being initially introduced into the reaction vessel together with the DMC catalyst and 1,8-octanediol (starter) as a solid [metal salt addition B1].
The time to the hot spot under $CO_2$ [activation 4] was 19 minutes.
The polyether carbonate polyol prepared in this way is distinguished by the following properties:
$CO_2$ incorporated [wt. %], based on the part of the polymer formed under $CO_2$: 23.1 wt. %;
Selectivity stated as the ratio of cyclic carbonate (undesirable by-product) to polyether carbonate polyol was 0.15;
OH number of the polyether carbonate polyol was 63.3 mg/g;
Polydispersity was 1.86.

Preparation of a Polyether Carbonate Polyol in the Presence of 88 Mg of Phenothiazine and 405 Mg of Calcium Stearate Example 16

The preparation was carried out in accordance with the general preparation instructions, phenothiazine, as the additive A, and calcium stearate, as the metal salt B, being initially introduced into the reaction vessel together with the DMC catalyst and 1,8-octanediol (starter) as a solid [additive addition A1 and metal salt addition B1].
The time to the hot spot under $CO_2$ [activation 4] was 7 minutes.
The polyether carbonate polyol prepared in this way is distinguished by the following properties:
$CO_2$ incorporated [wt. %], based on the part of the polymer formed under $CO_2$: 20.1 wt. %;

Selectivity stated as the ratio of cyclic carbonate (undesirable by-product) to polyether carbonate polyol was 0.09;
OH number of the polyether carbonate polyol was 65.5 mg/g;
Polydispersity was 1.27.

Preparation of a Polyether Carbonate Polyol in the Presence of 81 Mg of 2,4-Dinitrophenol and 405 mg of Calcium Stearate Example 17

The preparation was carried out in accordance with the general preparation instructions, 2,4-dinitrophenol, as the additive A, and calcium stearate, as the metal salt B, being initially introduced into the reaction vessel together with the DMC catalyst and 1,8-octanediol (starter) as a solid [additive addition A1 and metal salt addition B1].
The time to the hot spot under $CO_2$ [activation 4] was 7 minutes.
The polyether carbonate polyol prepared in this way is distinguished by the following properties:
$CO_2$ incorporated [wt. %], based on the part of the polymer formed under $CO_2$: 20.4 wt. %;
Selectivity stated as the ratio of cyclic carbonate (undesirable by-product) to polyether carbonate polyol was 0.09;
OH number of the polyether carbonate polyol was 63.2 mg/g;
Polydispersity was 1.24.

Preparation of a Polyether Carbonate Polyol in the Presence of 61 Mg of 4-Nitrophenol and 405 Mg of Calcium Stearate Example 18

The preparation was carried out in accordance with the general preparation instructions, 4-nitrophenol, as the additive A, and calcium stearate, as the metal salt B, being initially introduced into the reaction vessel together with the DMC catalyst and 1,8-octanediol (starter) as a solid [additive addition A1 and metal salt addition B1].
The time to the hot spot under $CO_2$ [activation 4] was 7 minutes.
The polyether carbonate polyol prepared in this way is distinguished by the following properties:
$CO_2$ incorporated [wt. %], based on the part of the polymer formed under $CO_2$: 20.4 wt. %;
Selectivity stated as the ratio of cyclic carbonate (undesirable by-product) to polyether carbonate polyol was 0.09;
OH number of the polyether carbonate polyol was 63.7 mg/g;
Polydispersity was 1.23.

Preparation of a Polyether Carbonate Polyol in the Presence of 88 Mg of Phenothiazine and 390 Mg of Aluminium Stearate Example 19

The preparation was carried out in accordance with the general preparation instructions, phenothiazine, as the additive A, and aluminium stearate, as the metal salt B, being initially introduced into the reaction vessel together with the DMC catalyst and 1,8-octanediol (starter) as a solid [additive addition A1 and metal salt addition B1].
The time to the hot spot under $CO_2$ [activation 4] was 10 minutes.
The polyether carbonate polyol prepared in this way is distinguished by the following properties:
$CO_2$ incorporated [wt. %], based on the part of the polymer formed under $CO_2$: 21.7 wt. %;
Selectivity stated as the ratio of cyclic carbonate (undesirable by-product) to polyether carbonate polyol was 0.16;
OH number of the polyether carbonate polyol was 66.9 mg/g;
Polydispersity was 1.40.

Preparation of a Polyether Carbonate Polyol in the Presence of 81 Mg of 2,4-Dinitrophenol and 390 Mg of Aluminium Stearate Example 20

The preparation was carried out in accordance with the general preparation instructions, 2,4-dinitrophenol, as the additive A, and aluminium stearate, as the metal salt B, being initially introduced into the reaction vessel together with the DMC catalyst and 1,8-octanediol (starter) as a solid [additive addition A1 and metal salt addition B1].
The time to the hot spot under $CO_2$ [activation 4] was 12 minutes.
The polyether carbonate polyol prepared in this way is distinguished by the following properties:
$CO_2$ incorporated [wt. %], based on the part of the polymer formed under $CO_2$: 23.4 wt. %;
Selectivity stated as the ratio of cyclic carbonate (undesirable by-product) to polyether carbonate polyol was 0.16;
OH number of the polyether carbonate polyol was 66.5 mg/g;
Polydispersity was 1.66.

Preparation of a Polyether Carbonate Polyol in the Presence of 61 Mg of 4-Nitrophenol and 390 Mg of Aluminium Stearate Example 21

The preparation was carried out in accordance with the general preparation instructions, 4-nitrophenol, as the additive A, and aluminium stearate, as the metal salt B, being initially introduced into the reaction vessel together with the DMC catalyst and 1,8-octanediol (starter) as a solid [additive addition A1 and metal salt addition B1].
The time to the hot spot under $CO_2$ [activation 4] was 12 minutes.
The polyether carbonate polyol prepared in this way is distinguished by the following properties:
$CO_2$ incorporated [wt. %], based on the part of the polymer formed under $CO_2$: 24.1 wt. %;
Selectivity stated as the ratio of cyclic carbonate (undesirable by-product) to polyether carbonate polyol was 0.13;
OH number of the polyether carbonate polyol was 61.5 mg/g;
Polydispersity was 1.61.

Preparation of a Polyether Carbonate Polyol in the Presence of 81 Mg of Phenoxazine and 405 Mg of Calcium Stearate Example 22

The preparation was carried out in accordance with the general preparation instructions, phenoxazine, as the additive A, and calcium stearate, as the metal salt B, being initially introduced into the reaction vessel together with the DMC catalyst and 1,8-octanediol (starter) as a solid [additive addition A1 and metal salt addition B1].

The time to the hot spot under $CO_2$ [activation 4] was 8 minutes.

The polyether carbonate polyol prepared in this way is distinguished by the following properties:
$CO_2$ incorporated [wt. %], based on the part of the polymer formed under $CO_2$: 18.3 wt. %;
Selectivity stated as the ratio of cyclic carbonate (undesirable by-product) to polyether carbonate polyol was 0.13;
OH number of the polyether carbonate polyol was 62.3 mg/g;
Polydispersity was 1.24.

Preparation of a Polyether Carbonate Polyol in the Presence of 81 Mg of Phenoxazine and 390 Mg of Aluminium Stearate Example 23

The preparation was carried out in accordance with the general preparation instructions, phenoxazine, as the additive A, and aluminium stearate, as the metal salt B, being initially introduced into the reaction vessel together with the DMC catalyst and 1,8-octanediol (starter) as a solid [additive addition A1 and metal salt addition B1].

The time to the hot spot under $CO_2$ [activation 4] was 8 minutes.

The polyether carbonate polyol prepared in this way is distinguished by the following properties:
$CO_2$ incorporated [wt. %], based on the part of the polymer formed under $CO_2$: 19.8 wt. %;
Selectivity stated as the ratio of cyclic carbonate (undesirable by-product) to polyether carbonate polyol was 0.18;
OH number of the polyether carbonate polyol was 60.3 mg/g;
Polydispersity was 1.22.

Discussion of the Results of Examples 14-23 (Table 2)

Examples 16 to 23 of Table 2 demonstrate the advantageous effect of the simultaneous use of an additive A) and a metal salt B). Compared with the process without these additives (Comparison Example 1, Table 1), a more favourable selectivity, a shorter activation time and at the same time a high content of $CO_2$ incorporated in the resulting polyether carbonate polyol are achieved. The combination of 4-nitrophenol or 2,4-dinitrophenol with calcium stearate or aluminium stearate (Examples 17, 18, 20 and 21) proved to be particularly favourable.

TABLE 1

Results of the polyether carbonate polyol preparation

| Example | Additive A) | [mmol of additive A)]/[mmol of Co] | Time 1 [min] | $CO_2$ incorporation [wt. %] | Selectivity cyclic/linear | OH number [mg of KOH/g] | Poly-dispersity |
|---|---|---|---|---|---|---|---|
| 1 (comp.) | without additive | 0 | 33 | 19.9 | 0.21 | 67.2 | 1.45 |
| 2 (comp.) | 2,4,6-tri-tert-butylphenol (31 g dissolved in 435 g of PO (continuous PO addition)) | 448.59 | 60 | 20.4 | 0.21 | 69.1 | 1.65 |
| 3 | 4-nitrophenol | 1.67 | 6 | 19.3 | 0.15 | 61.3 | 1.40 |
| 4 | 4-nitrophenol (dissolved in 64 g of PO, addition during activation) | 1.67 | 7 | 18.3 | 0.19 | 65.5 | 1.22 |
| 5 | 2,4-dinitrophenol | 1.67 | 14 | 18.0 | 0.16 | 59.3 | 1.17 |
| 6 | 4-tert-butyl-pyrocatechol | 1.67 | 17 | 19.8 | 0.18 | 65.1 | 1.38 |
| 7 | phenothiazine | 1.67 | 6 | 18.6 | 0.15 | 57.8 | 1.30 |
| 8 | phenothiazine (dissolved in 25 g of PO, addition in one activation step) | 1.67 | 7 | 17.8 | 0.19 | 64.9 | 1.19 |
| 9 | phenoxazine | 1.67 | 21 | 20.8 | 0.17 | 56.7 | 1.40 |
| 10 | 2,2,6,6-tetramethylpiperidine 1-oxyl | 1.67 | 15 | 19.0 | 0.16 | 61.8 | 1.23 |
| 11 | trans-β-nitrostyrene | 1.67 | 19 | 19.5 | 0.15 | 62.6 | 1.42 |
| 12 | 2,2'-dithiobis(benzothiazole) | 1.67 | 9 | 19.0 | 0.18 | 64.6 | 1.17 |
| 13 (comp.) | α-methylstyrene | 1.67 | 30 | 17.2 | 0.22 | 70.5 | 1.47 | comp. = comparison example

TABLE 2

Results of the polyether carbonate polyol preparation

| Example | Additive A) | Metal salt B) | [mmol of additive A)]/[mmol of Co] | [mmol of metal salt B)]/[mmol of Co] | Time 1 [min] | $CO_2$ incorporation [wt. %] | Selectivity cyclic/linear | OH number [mg of KOH/g] | Poly-dispersity |
|---|---|---|---|---|---|---|---|---|---|
| 14 (comp.) | without additive A) | calcium stearate | 0 | 2.54 | 15 | 20.2 | 0.10 | 64.3 | 1.37 |
| 15 (comp.) | without additive A) | aluminium stearate | 0 | 1.67 | 19 | 23.1 | 0.15 | 63.3 | 1.86 |
| 16 | phenothiazine | calcium stearate | 1.67 | 2.54 | 7 | 20.1 | 0.09 | 65.5 | 1.27 |
| 17 | 2,4-dinitrophenol | calcium stearate | 1.67 | 2.54 | 7 | 20.4 | 0.09 | 63.2 | 1.24 |
| 18 | 4-nitrophenol | calcium stearate | 1.67 | 2.54 | 7 | 20.4 | 0.09 | 63.7 | 1.23 |
| 19 | phenothiazine | aluminium stearate | 1.67 | 1.67 | 10 | 21.7 | 0.16 | 66.9 | 1.40 |
| 20 | 2,4-dinitrophenol | aluminium stearate | 1.67 | 1.67 | 12 | 23.4 | 0.16 | 66.5 | 1.66 |
| 21 | 4-nitrophenol | aluminium stearate | 1.67 | 1.67 | 12 | 24.1 | 0.13 | 61.5 | 1.61 |
| 22 | phenoxazine | calcium stearate | 1.67 | 2.54 | 8 | 18.3 | 0.13 | 62.3 | 1.24 |
| 23 | phenoxazine | aluminium stearate | 1.67 | 1.67 | 8 | 19.8 | 0.18 | 60.9 | 1.22 | comp. = comparison example

The invention claimed is:

1. A process for the preparing a polyether carbonate polyol from one or more H-functional starter substances, one or more alkylene oxides and carbon dioxide in the presence of a double metal cyanide catalyst and in the presence of at least one additive A), the process comprising:

(α) initially introducing the H-functional starter substance or a mixture of at least two H-functional starter substances into a reaction vessel, the DMC catalyst being added to the H-functional starter substance or the mixture of at least two H-functional starter substances, (β) for the activation, adding a part amount based on the total amount of alkylene oxides employed in the activation and copolymerization of one or more alkylene oxides to the mixture resulting from step (α), optionally in the presence of $CO_2$, and the temperature peak which occurs due to the subsequent exothermic chemical reaction and/or a drop in pressure in the reactor then in each case being awaited, and it also being possible for step (β) to be carried out several times for the activation, (γ) adding one or more alkylene oxides and carbon dioxide to the mixture resulting from step (β) in a copolymerization, it being possible for the alkylene oxides employed for the copolymerization to be identical to or different from the alkylene oxides employed in the activation, wherein the additive A) is added in step (α) to the H-functional starter substance or the mixture of at least two H-functional starter substances and/or the additive A) is added in step (β) to the part amount of one or more alkylene oxides to the mixture resulting from step (α), and wherein the additive A) is at least one compound chosen from the group consisting of sterically non-hindered phenols according to formula (II)

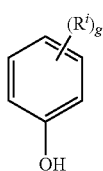

(II)

wherein g =1 or 2, and $R^i$ represents an amino, bromo, chloro, cyano, fluoro, iodo, methoxy, methyl or nitro group, catechols according to formula (IIIa) and pyrocatechols according to formula (IIIb)

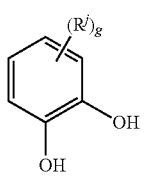

(IIIa)

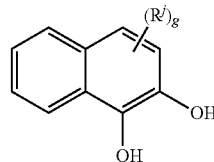

(IIIb)

wherein g has the above-mentioned meaning and $R^j$ represents an acetamido, amino, bromo, n-butyl, iso-butyl, tert-butyl, chloro, cyano, ethoxy, ethyl, fluoro, iodo, methoxy, methyl, nitro, iso-propyl, n-propyl group, phenothiazines, benzothiazole, phenoxazines, 2,2,6,6-tetramethylpiperidine 1-oxyl and nitrostyrenes.

2. The process according to claim 1, wherein the process is carried out in the presence of a DMC catalyst and in the presence of at least one additive A) and in the presence of at least one metal salt B), characterized in that wherein the additive A) is added in step (α) to the H-functional starter substance or the mixture of at least two H-functional starter substances, and/or the additive A) is added in step (β) to the part amount of one or more alkylene oxides to the mixture resulting from step (α), wherein at least one compound chosen from the group consisting of alkaline earth metal halides, alkaline earth metal carboxylates or aluminium carboxylates is employed as the metal salt B).

3. The process according to claim 2, wherein 4-nitrophenol and/or 2,4-dinitrophenol is employed as the additive A) and at least one compound chosen from the group consisting of magnesium acetate, calcium acetate, magnesium stearate, calcium stearate and aluminium stearate is employed as the metal salt B).

4. The process according to claim 1, characterized in that in step (α) the H-functional starter substance or a mixture of at least two H-functional starter substances is initially introduced into the reaction vessel and water is removed by elevated temperature and/or reduced pressure, the DMC catalyst, the additive A) and optionally the metal salt B) being added to the H-functional starter substance or the mixture of at least two H-functional starter substances before or after the drying.

5. The process according to claim 1, wherein for the activation according to step (β)

(β1) in a first activation step a first part amount based on the total amount of alkylene oxides employed in the activation and copolymerization of one or more alkylene oxides is added to the mixture resulting from step (α), optionally in the presence of $CO_2$, and the temperature peak ("hot spot") which occurs due to the subsequent exothermic chemical reaction and/or a drop in pressure in the reactor then in each case being awaited (β2) in a second activation step after the temperature peak reached in the preceding activation step, a second part amount based on the total amount of alkylene oxides employed in the activation and copolymerization of one or more alkylene oxides is added to the mixture resulting from the preceding activation step, optionally in the presence of $CO_2$, and the temperature peak which occurs due to the subsequent exothermic chemical reaction and/or a drop in pressure in the reactor then in each case being awaited.

6. The process according to claim 5, wherein for the activation (β3) in a third activation step or further activation steps after the temperature peak reached in the preceding activation step, step (β2) is repeated once to five times, this addition of the part amount or these additions of the part amounts of alkylene oxide being carried out in the absence of $CO_2$.

7. The process according to claim 6, wherein for the activation (β4) in a further activation step or further activation steps, after the temperature peak reached in the preceding activation step, step (β3) is repeated once to five times, this addition of the part amount or these additions of the part amounts of alkylene oxide being carried out in the presence of $CO_2$.

8. The process according to claim 7, wherein the particular part amount of one or more alkylene oxides which is employed in the activation in steps β1 to β4 is 2.0 to 15.0 wt. % based on the total amount of alkylene oxides employed in the activation and copolymerization.

9. The process according to claim 1, wherein the amount of the additives A) employed is from 0.2 to 10.0 [mmol of additive A)]/[mmol of Co].

10. The process according to claim 2, wherein the amount of the additive A) employed is from 0.8 to 4.0 [mmol of additive A)]/[mmol of Co] and the amount of the metal salt B) employed is 0.8 to 4.0 [mmol of metal salt B)]/[mmol of Co].

11. The process according to claim 1, wherein as the additive A), sterically non-hindered phenols according to formula (II)

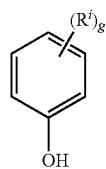

(II)

and/or
catechols according to formula (IIIa) or pyrocatechols according to formula (IIIb)

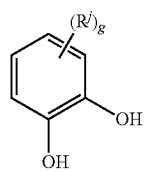

(IIIa)

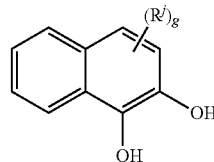

(IIIb)

and/or
wherein in the above-mentioned formulae
g =1 or 2 and
$R^i$ represents an amino, bromo, chloro, cyano, fluoro, iodo, methoxy, methyl or nitro group,
$R^j$ represents an acetamido, amino, bromo, n-butyl, iso-butyl, tert-butyl, chloro, cyano, ethoxy, ethyl, fluoro, iodo, methoxy, methyl, nitro, iso-propyl, n-propyl group,
and/or
α-nitrostyrene or β-nitrostyrene, are employed.

12. The process according to claim 1, wherein the H-functional starter substances employed are chosen from the group consisting of alcohols, amines, thiols, amino alcohols, thio-alcohols, hydroxy esters, polyether polyols, polyester polyols, polyester ether polyols, polycarbonate polyols, polyether carbonate polyols, polyethyleneimines, polyether-amines, polytetrahydrofurans, polyether thiols, polyacrylate polyols, castor oil, the mono- or diglyceride of ricinoleic acid, monoglycerides of fatty acids, and chemically modified mono-, di- and/or triglycerides of fatty acids and $C_1$-$C_{24}$-alkyl fatty acid esters which contain on average at least 2 OH groups per molecule, and combinations thereof.

13. The process according to claim 1, wherein the double metal cyanide catalyst employed contains at least one double metal cyanide compound chosen from the group consisting of zinc hexacyanocobaltate(III), zinc hexacyanoiridate(III), zinc hexacyanoferrate(III) and cobalt(II) hexacyanocobaltate (III).

14. The process according to claim 13, wherein the double metal cyanide catalyst employed additionally contains at least one organic complexing ligand chosen from the group consisting of aliphatic ethers, ethanol, isopropanol, n-butanol, iso-butanol, sec-butanol, tert-butanol, 2-methyl-3-buten-2-ol, 2-methyl-3-butyn-2-ol, ethylene glycol mono-tert-butyl ether, diethylene glycol mono-tert-butyl ether, tripropylene glycol monomethyl ether and 3-methyl-3-oxetane-methanol.

15. The process according to claim 1, wherein the process is carried out in a tube reactor, stirred tank or loop reactor.

* * * * *